United States Patent
Gopal et al.

(10) Patent No.: US 9,462,553 B2
(45) Date of Patent: Oct. 4, 2016

(54) MOBILITY BASED POWER CONSERVATION

(71) Applicant: QUALCOMM Incorporated, San Diego, CA (US)

(72) Inventors: Thawatt Gopal, San Diego, CA (US); Ping Zhou, San Diego, CA (US); Chao Jin, San Diego, CA (US); Shanshan Wang, San Diego, CA (US); Insung Kang, San Diego, CA (US); Josephine Bolotski, Seattle, WA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 103 days.

(21) Appl. No.: 14/524,975

(22) Filed: Oct. 27, 2014

(65) Prior Publication Data

US 2016/0119876 A1    Apr. 28, 2016

(51) Int. Cl.
| | |
|---|---|
| H04L 12/26 | (2006.01) |
| H04W 52/02 | (2009.01) |
| H04W 24/02 | (2009.01) |
| H04W 36/00 | (2009.01) |
| H04W 36/04 | (2009.01) |
| H04W 36/32 | (2009.01) |
| H04W 48/18 | (2009.01) |

(52) U.S. Cl.
CPC ......... *H04W 52/0251* (2013.01); *H04W 24/02* (2013.01); *H04W 36/0083* (2013.01); *H04W 36/0088* (2013.01); *H04W 36/04* (2013.01); *H04W 36/32* (2013.01); *H04W 48/18* (2013.01)

(58) Field of Classification Search
CPC ............... H04W 52/0251; H04W 36/0083; H04W 24/02; H04W 36/32; H04W 48/18; H04W 36/04; H04W 36/0088
See application file for complete search history.

(56) References Cited

U.S. PATENT DOCUMENTS

| | | | |
|---|---|---|---|
| 8,107,416 B2 | 1/2012 | Jeong et al. | |
| 8,423,066 B2 | 4/2013 | Deluca | |
| 2008/0285494 A1 | 11/2008 | Shin | |
| 2010/0159950 A1* | 6/2010 | Toh | H04J 11/0086 455/456.1 |
| 2010/0202307 A1* | 8/2010 | Lee | H04W 36/0088 370/252 |
| 2011/0201279 A1 | 8/2011 | Suzuki et al. | |
| 2013/0242774 A1* | 9/2013 | Wang | H04W 36/30 370/252 |
| 2013/0258876 A1 | 10/2013 | Damji et al. | |

FOREIGN PATENT DOCUMENTS

| | | |
|---|---|---|
| EP | 2717625 A1 | 4/2014 |
| WO | 2009054702 A1 | 4/2009 |
| WO | 2014023362 A1 | 2/2014 |

OTHER PUBLICATIONS

International Search Report and Written Opinion—PCT/US2015/054020—ISA/EPO—Jan. 8, 2016.

* cited by examiner

*Primary Examiner* — Phuc Tran
(74) *Attorney, Agent, or Firm* — Seyfarth Shaw LLP

(57) ABSTRACT

A user equipment (UE) prioritizes searches and/or measurements of neighbor cells/frequencies based on a level of mobility of a UE. In one instance, the UE identifies a priority of a layer of a radio access technology (RAT) to be measured or searched and identifies a level of mobility of the UE. A sensor module of the UE may determine the level of mobility of the UE and generate an indication corresponding to the level of mobility of the UE. The UE prioritizes a periodicity of interlayer search and/or measurement based on the priority of the layer to be measured and the level of the mobility of the UE.

24 Claims, 7 Drawing Sheets

MOBILITY BASED POWER CONSERVATION

BACKGROUND

1. Field

Aspects of the present disclosure relate generally to wireless communication systems, and more particularly, to prioritizing searches and/or measurements of neighbor cells/frequencies based on a level of mobility of a UE.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes prioritizing a periodicity of interlayer search and/or measurement based on a priority of a layer to be measured and a level of user equipment (UE) mobility.

According to another aspect of the present disclosure, an apparatus for wireless communication includes means for identifying a priority of a layer to be measured and a level of user equipment (UE) mobility. The apparatus may also include means for prioritizing a periodicity of interlayer search and/or measurement based on the priority of the layer to be measured and the level of UE mobility.

Another aspect discloses an apparatus for wireless communication and includes a memory and at least one processor coupled to the memory. The processor(s) is configured to prioritize a periodicity of interlayer search and/or measurement based on a priority of a layer to be measured and a level of user equipment (UE) mobility.

Yet another aspect discloses a computer program product for wireless communications in a wireless network having a non-transitory computer-readable medium. The computer readable medium has non-transitory program code recorded thereon which, when executed by the processor(s), causes the processor(s) to prioritize a periodicity of interlayer search and/or measurement based on a priority of a layer to be measured and a level of user equipment (UE) mobility.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
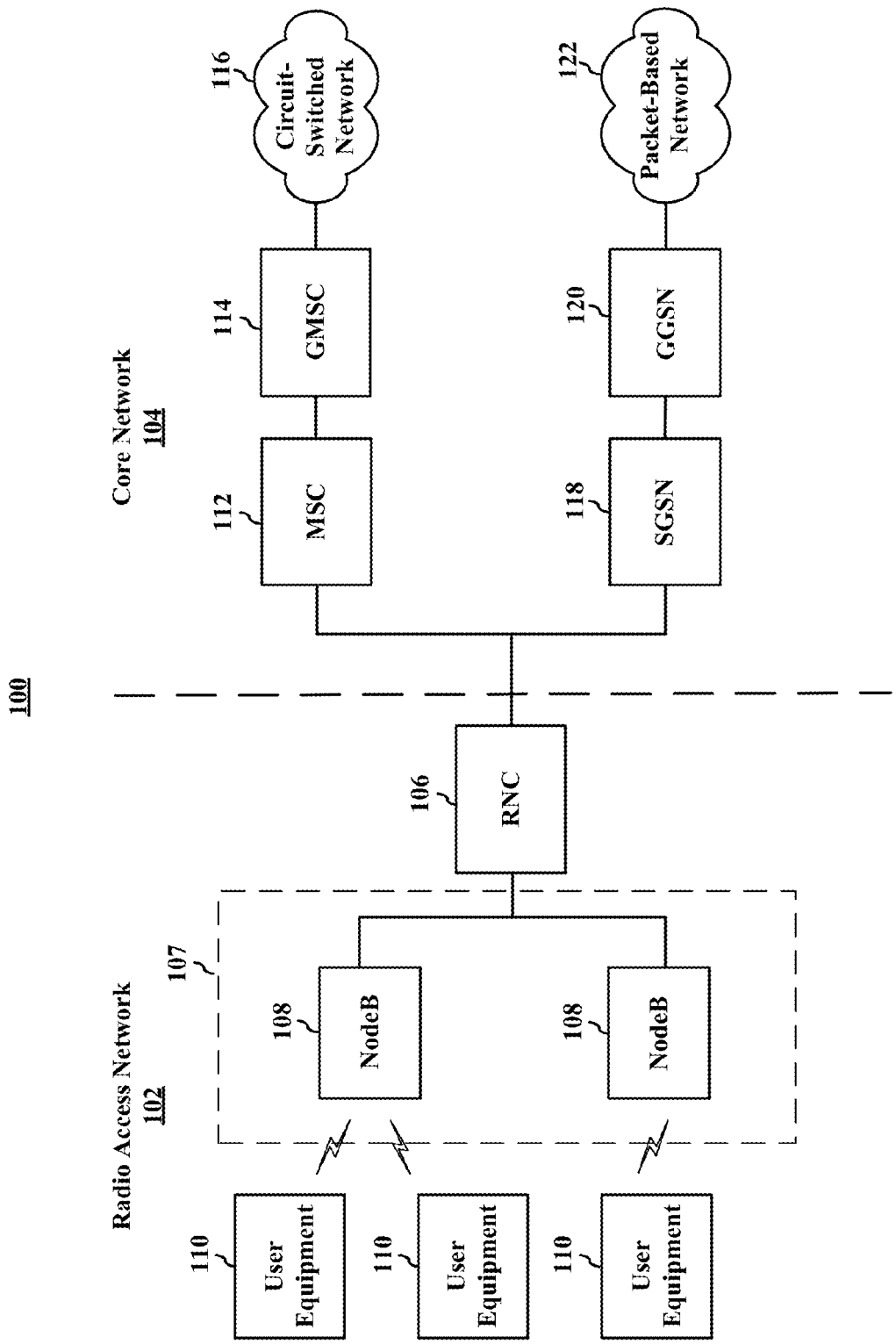
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of radio network subsystems (RNSs) such as an RNS 107, each controlled by a radio network controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

General packet radio service (GPRS) is designed to provide packet-data services at speeds higher than those available with standard GSM circuit switched data services. The core network 104 also supports packet-data services with a serving GPRS support node (SGSN) 118 and a gateway GPRS support node (GGSN) 120. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit switched domain.

The UMTS air interface is a spread spectrum direct-sequence code division multiple access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
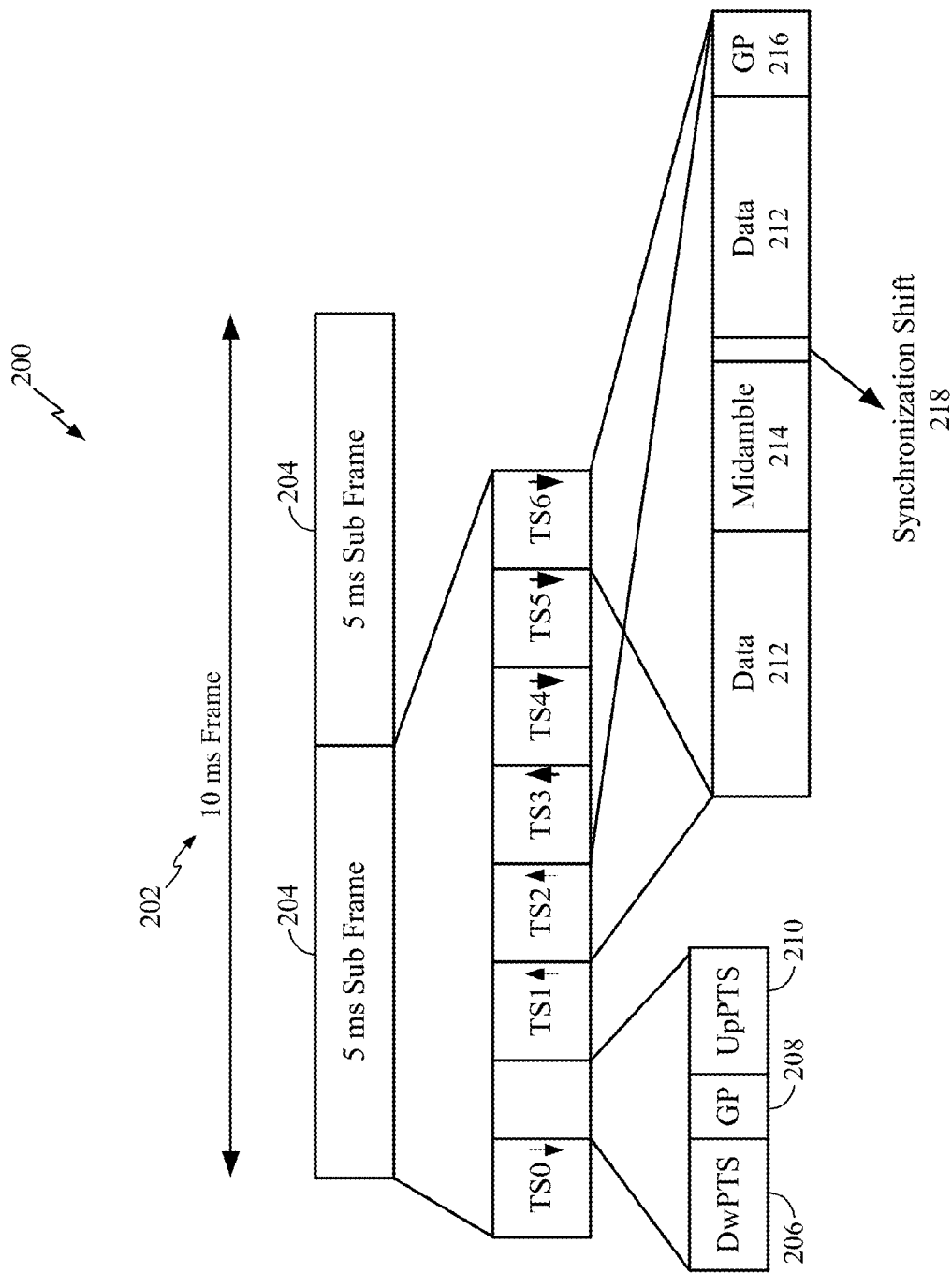
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including synchronization shift (SS) bits 218. Synchronization Shift bits 218 only appear in the second part of the data portion. The synchronization shift bits 218 immediately following the midamble can indicate three cases: decrease shift, increase shift, or do nothing in the upload transmit timing. The positions of the synchronization shift bits 218 are not generally used during uplink communications.

Figure 3:
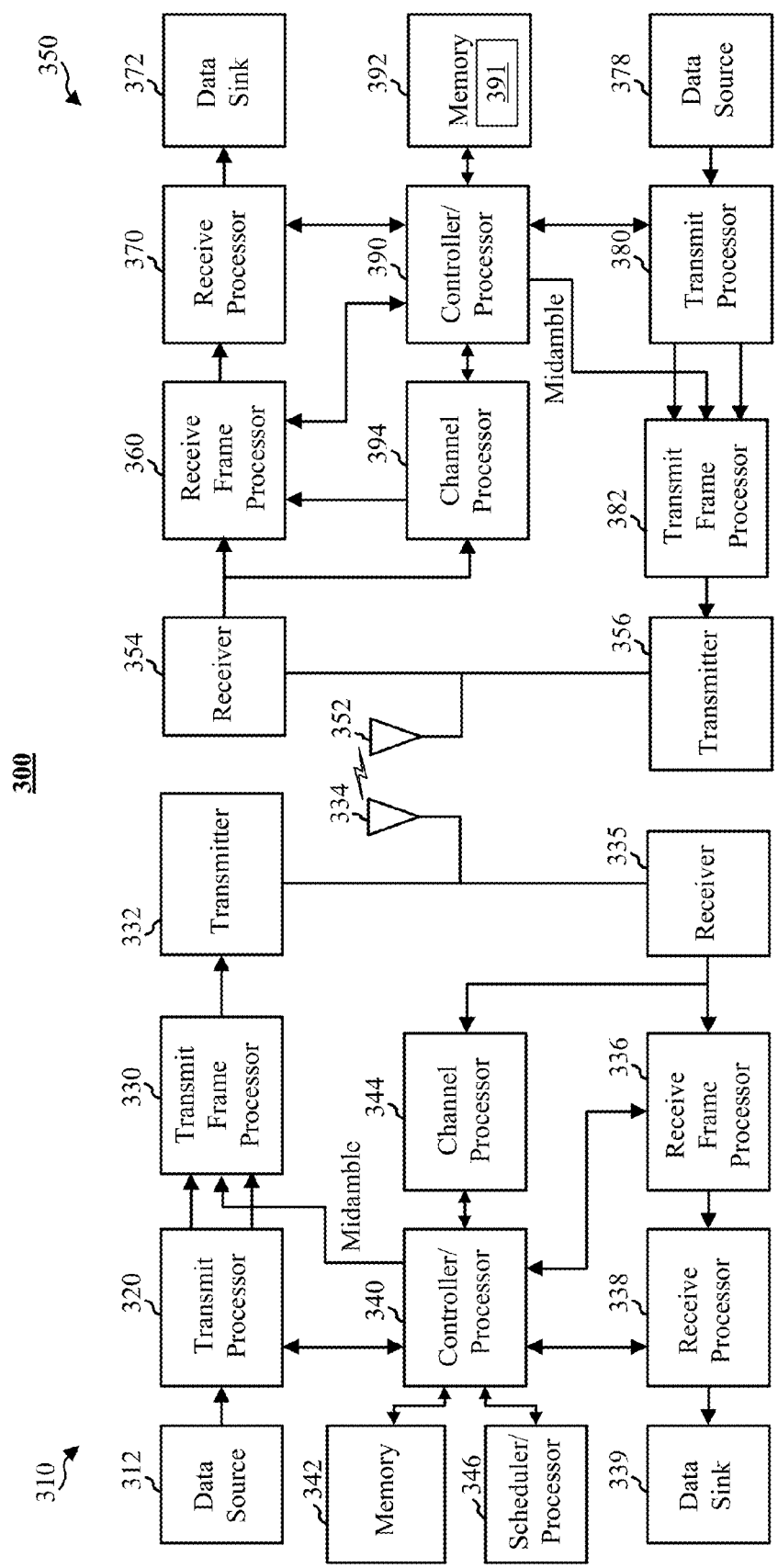
FIG. 3 is a block diagram conceptually illustrating an example of a node B in communication with a user equipment (UE) in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the node B 310 and the UE 350, respectively. For example, the memory 392 of the UE 350 may store a mobility based power conservation module 391 which, when executed by the controller/processor 390, configures the UE 350 for prioritizing periodicity of interlayer searches and/or measurements. A scheduler/processor 346 at the node B 310 may be used to allocate resources to the UEs and schedule downlink and/or uplink transmissions for the UEs.

Figure 4:
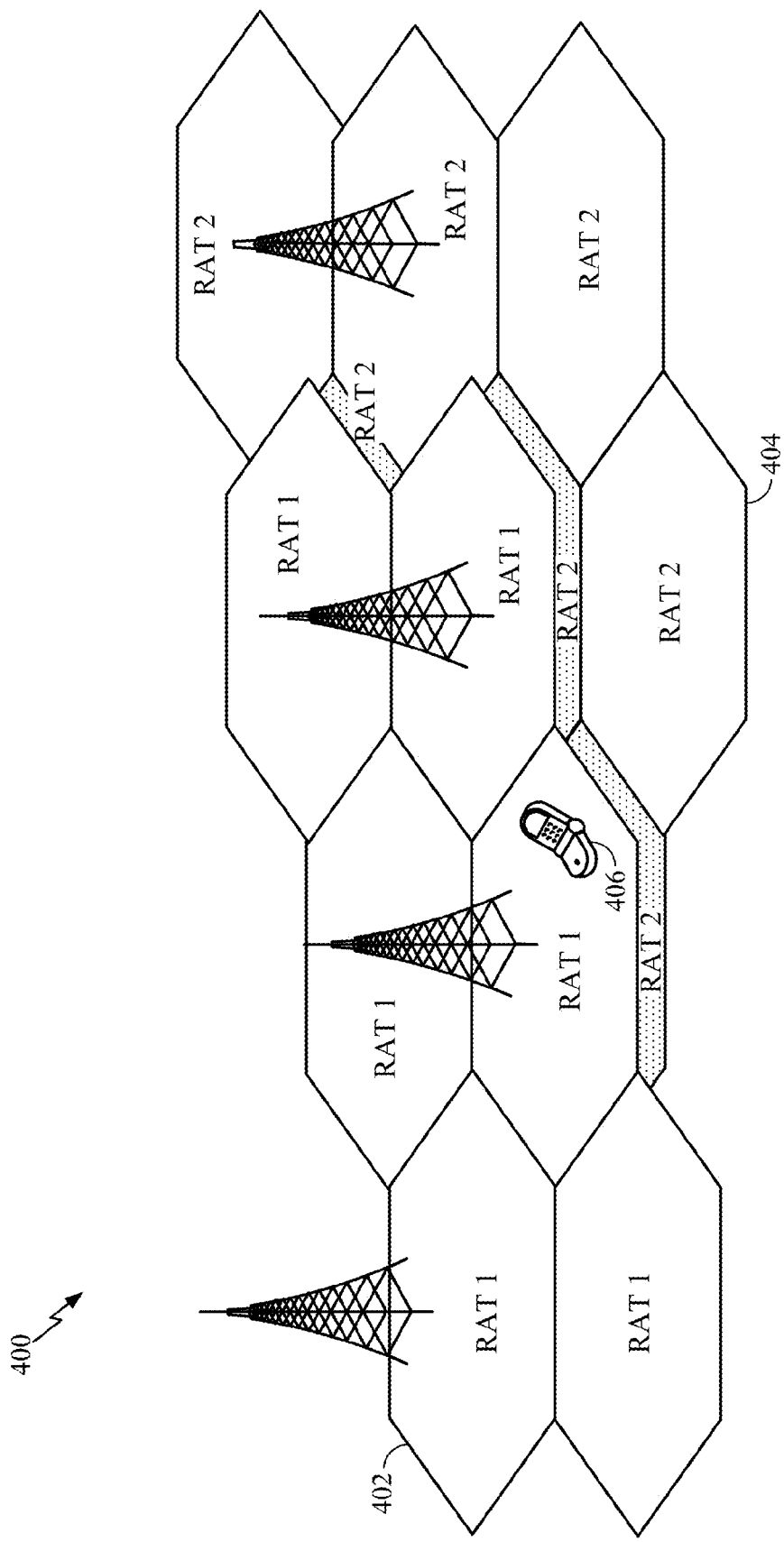
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of an established network utilizing a first type of radio access technology (RAT-1), such as GSM, TD-SCDMA or Long Term Evolution (LTE) and also illustrates a newly deployed network utilizing a second type of radio access technology (RAT-2), such as a GSM, TD-SCDMA or Long Term Evolution (LTE). Those skilled in the art will appreciate that the network may contain more than two types of RATs. For example, the geographical area 400 may also include a third RAT, such as, but not limited to GSM, TD-SCDMA or Long Term Evolution (LTE).

The geographical area 400 may include RAT-1 cells 402 and RAT-2 cells 404. In one example, the RAT-1 cells are TD-SCDMA/GSM cells and the RAT-2 cells are LTE cells. However, those skilled in the art will appreciate that other types of radio access technologies may be utilized within the cells. A user equipment (UE) 406 may move from one cell, such as a RAT-1 cell 404, to another cell, such as a RAT-2 cell 402. The movement of the UE 406 may specify a handover or a cell reselection.

Handover or cell reselection may be performed when the UE moves from one coverage area to another coverage area of a same or different RAT. A handover or cell reselection may also be performed when there is a coverage hole or lack of coverage in one network or when there is traffic balancing between the networks of the different types of RATs. For example, when the UE is in a connected mode with a first RAT and in the coverage area of a second RAT, the UE may be handed over to the second RAT. Otherwise, when the UE is in a discontinuous reception (DRX) mode with a first RAT and in the coverage area of a second RAT, the UE may reselect the second RAT.

Some cell reselection procedures are ranked based. For example, cell reselection from a first RAT, such as TD-SCDMA, to a second RAT, such as GSM, may be rank based. In this reselection procedure, a network determines the configuration for reselection of the neighbor cells. Cell reselection according to the rank based configuration may include a ranking of the neighbor cells for a particular UE based on received signal level of the neighbor cells. For example, the received signal quality includes a signal quality metric of a measured common pilot channel of the neighbor cell.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc. Signal quality is intended to cover the term signal strength, as well.

Other cell reselection procedures from the first RAT to a different RAT, such as LTE, are based on priority. For example, the LTE cell for a priority based cell reselection may be configured with a higher priority than a TD-SCDMA cell. A RAT may be prioritized based on the preference of the UE, the type of call and other parameters. For example, a UE may prefer to connect to LTE in certain situations (e.g., packet switched call) and to TD-SCDMA in other situations (e.g., circuit switched call). The network may broadcast priority configurations.

In some systems, LTE is configured as the highest priority RAT. Thus, even when the UE is in a good coverage area with respect to the first RAT, LTE is scanned. The network and/or the UE may configure the priority of the RATs. The priority configuration may conform to a standard or a proprietary mechanism.

As part of that handover or cell reselection process, while in a connected mode or discontinuous reception (DRX) mode with a first RAT (e.g., GSM, LTE or TD-SCDMA), a user equipment (UE) may be specified to perform activities at a second RAT (e.g., GSM, LTE or TD-SCDMA). The second RAT may be the same or different from the first RAT. For example, the first and the second RAT may be of the same RAT type but operate with different frequencies. The discontinuous reception mode may include idle mode, cell paging channel (CELL_PCH) mode, and universal terrestrial radio access network (UTRAN) registration area paging channel (URA_PCH) mode.

The UE operating in discontinuous reception mode may periodically enter an active state during which the UE may receive messages on a paging channel from base stations with which the UE has previously established communication. For example, the UE may awaken from an inactive state prior to its assigned frame, monitor the paging channels for messages, and revert to the inactive state if additional communication is not desired. The time between two consecutive paging messages is called a discontinuous reception cycle.

Further, the UE may tune away from the first RAT to perform the activities at the second RAT while in a connected mode or discontinuous reception mode. The activity performed when tuning away may include selecting and monitoring an indicated paging indicator channel (PICH) and paging channel (PCH), monitoring for paging information of the second RAT, monitoring and collecting system information of the second RAT (e.g., frequency of the second RAT), performing measurements (e.g., inter radio access technology and/or inter frequency measurements) for cells/frequencies of the first RAT and neighbor cells of the second RAT, executing cell reselection evaluation processes, and/or performing cell reselection to reselect to a neighbor cell of the second RAT when cell reselection trigger conditions are met.

Some network configurations (e.g., LTE/TD-SCDMA) provide for measurement gaps when the UE is in a connected mode and/or discontinuous reception mode. The measurement gaps may be configured by the network. For example, a base station (e.g., eNB) may instruct the UE to be silent (i.e., no uplink and/or downlink communications) periodically over a specified cycle. The measurement gaps may correspond to silent periods and may be deemed idle interval gaps or dedicated channel (DCH) measurement occasions (DMO). For example, an idle-interval gap may include 10 millisecond (ms) gaps with a periodicity 40 ms or 80 ms where the network does not transmit downlink data during the measurement gaps. Dedicated channel measurement occasions may have flexible gap size and gap periodicity. For example, the measurement gaps based on the dedicated channel measurement occasions may include 10 ms gaps with a periodicity of 80 ms, 20 ms gaps with a periodicity of 160 ms, 40 ms gaps with a periodicity of 320 ms, and 40 ms gaps with a periodicity of 640 ms. Other measurement gaps include 6 ms out of every 40 ms and 6 ms out of every 80 ms.

As noted, the measurements gaps may be configured by a network. However, some measurement gap patterns can be configured in a process initiated by the UE. For some handover or reselection procedures, e.g., WCDMA to another RAT (e.g., LTE) the measurement gaps are configured with several gaps sizes and periodicity as defined by a specification. For example, the measurement gaps for WCDMA to LTE may include 6.66 ms or 9.66 ms measurement gaps with a periodicity of 120 ms.

In accordance with the reselection or handover procedure, the UE performs radio access technology measurements on the neighbor cells/frequencies (e.g., LTE neighbor cells/frequencies). Some of the measurements include measurements of received signal code power (RSCP) for a primary common control physical channel (P-CCPCH) of an inter frequency neighbor. For example, the UE may perform measurements of LTE neighbor frequencies that have higher priority or lower priority than the TD-SCDMA serving cell when a signal strength of the TD-SCDMA serving cell is below a threshold indicated by the TD-SCDMA network.

The measurements may be periodic or occur at specified time periods, during certain situations, or in response to conditions that trigger the measurements. For example, according to some network specifications (e.g., 3GPP), the UE may perform measurement of LTE cells according to a schedule.

Mobility Based Power Control

Aspect of the present disclosure are directed to prioritizing periodicity of search and/or measurement (e.g., inter-layer search/measurement) based on a priority of a layer to be measured and a level of user equipment (UE) mobility. In one aspect of the disclosure, the layer may include a frequency/cell of a same or different RAT or a group of frequencies/cells of a RAT. A sensor module (e.g., a UE-based motion-sensor mobility detection module) may determine the level of mobility of the UE. Prioritizing the periodicity of search and/or measurement may include adjusting the search and/or measurement periodicity or frequency based on an adjustment value. The adjustment value may be determined based on the level of mobility of the UE.

In one aspect of the disclosure, the level of mobility may be represented by an indication received from the sensor module. The indication from the sensor module may be used to adjust or regulate how frequently the UE performs measurements of a radio access technology (RAT) while a UE is in connected mode. For example, an adjustment value, which may be determined based on the indication, may be used as a multiplier to adjust the periodicity of the search and/or measurement.

The adjustment of search and/or measurement may also be based on the type of RAT (e.g. TD-SCDMA, LTE, GSM, WCDMA) and corresponding priority of the RAT. The search and/or measurements of a particular RAT may be prioritized based on a type of call (e.g., voice or data call) and the type of RAT when the UE is in the connected mode, as well as which RAT type is configured for the IRAT measurement during the call. For example, when the UE is served by a TD-SCDMA cell and the call type is a packet switched call, the LTE search and/or measurement is prioritized over the search and/or measurement of other configured RATs (e.g., GSM and TD-SCDMA). This follows because LTE cells have better packet switched quality of service/throughput. In some aspects of the disclosure, the UE may only adjust the periodicity of measurement or the periodicity of the search.

In other aspects of the disclosure, the indication may be used to adjust how frequently a UE performs discontinuous reception mode (e.g., idle mode) searches and measurements. Similar to the connected mode adjustments, the idle mode adjustments are also based on the mobility of the UE. For example, adjustments to the search and/or measurement periodicity may occur when the UE is in a stationary state or in a mobile state. In some aspects of the disclosure, the periodicity of search and the periodicity of measurement are determined independently while the UE is in the idle mode. For example, the search and measurement periodicities may be adjusted with different multiplication factors based on mobility information. Similar to the connected mode, adjustments to the periodicity of measurement and/or search in the discontinuous reception mode is based on the RAT type, and the priority of the RAT for the measurements (e.g. intra and inter RAT search/measurement).

When measurements are not performed by the UE in allocated measurement gaps, some features of the UE are turned off to conserve power. For example, the UE may power off a radio frequency (RF) component (e.g., wireless transmitter/receiver). The UE may also power off a digital domain baseband processor because there are no samples streaming in from a radio frequency (RF) module in this power reduction state. The power saved may be based on the amount of time the features of the UE are turned off. For example, the power saved depends on the percentage of time the UE decides to throttle or adjust the measurements (e.g., inter radio access technology (IRAT) measurements) associated with the network configured measurement gaps in favor of saving power.

In discontinuous reception mode or idle mode, however, there are no measurement gaps configured by the network. In the discontinuous reception mode or idle mode the UE is either asleep for a duration of time or awake for a duration of time. When the UE is awake, the UE may monitor a paging indicator channel, a paging channel, and broadcast channel information and perform intra and/or inter RAT measurements. The UE may reduce the searches and/or measurements or throttle the searches and/or measurements in the idle mode. By throttling or reducing the idle mode searches and/or measurements, the UE reduces the duration that the UE is awake and thereby conserves power due to reduced circuitry usage during the sleep period.

In one aspect of the present disclosure, the UE stops the measurement of low priority layers. In other aspects of the disclosure, the UE powers off radio frequency (RF) circuitry during network measurement gaps for the low priority layers.

In one aspect of the present disclosure, the prioritizing of the periodicity of search and/or measurement is further based at least in part on a serving cell signal quality and/or the target cell signal quality. The signal quality of the serving and/or target cells may be compared to a threshold. Cell reselection or handover to one of the target cells may be triggered based on whether the signal quality of the serving cell and/or target cell is above or below the threshold.

Figure 5:
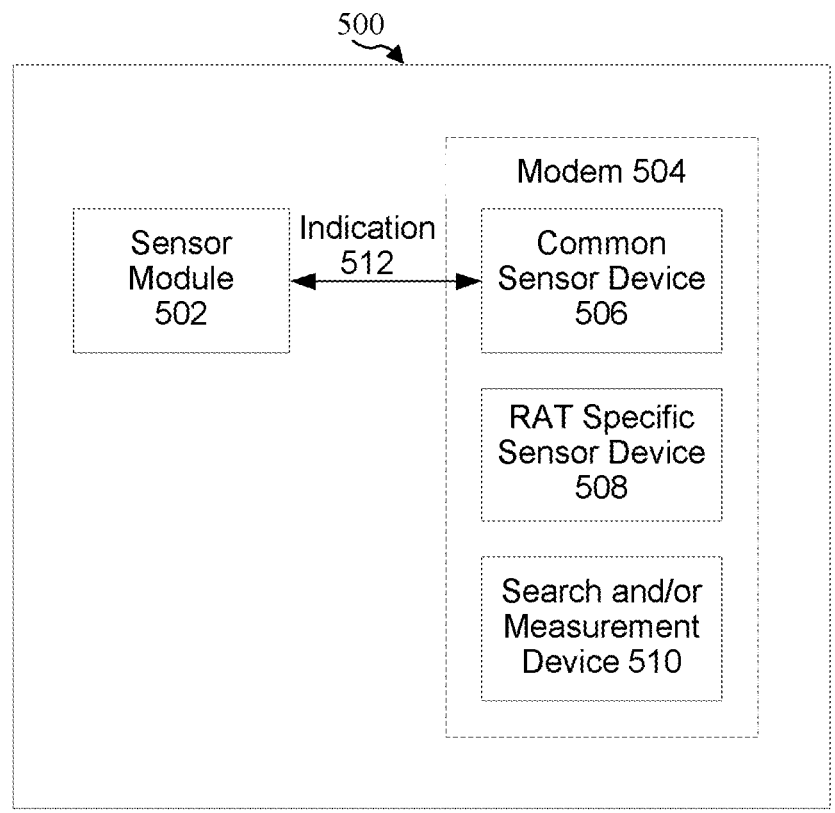
FIG. 5 illustrates a mobility based power conservation implementation when a user equipment is in a connected mode or discontinuous reception (DRX) mode according to one aspect of the disclosure.

FIG. 5 illustrates a mobility based power conservation implementation when a user equipment (UE) 500 is in a connected mode or discontinuous reception mode according to one aspect of the disclosure. The implementation improves power consumption by the UE 500 based on detection of the motion of the UE 500. The UE 500 may include a sensor module 502 and a modem 504 coupled to the sensor module 502. The modem includes a common sensor device 506, a RAT specific sensor device monitor 508 and a search and/or measurement module 510. The search and/or measurement module 510 may be configured to schedule the search and/or measurements based on the mobility state of the UE. The sensor module 502 and a modem 504, including the devices or modules 506, 508 and 510, may be configured for connected mode and/or discontinuous reception mode implementations.

In one aspect of the disclosure, the motion of the UE 500 may be detected by the sensor module 502, which generates an indication 512 corresponding to the motion. For example, the indication 512 may show that the UE 500 is in a stationary state or a low/high mobility state. The indication 512 may also show that the UE 500 has transitioned from a first state to another. For example, the indication 512 may show that the UE 500 has transitioned from a mobile state to a stationary state or that the UE 500 has transitioned from a high-mobility state to a low-mobility state.

The common sensor device 506 may receive the indication 512. The common sensor device 506 identifies the indication 512 and forwards the indication 512 to the appropriate RAT specific sensor device monitor 508. For example, when the current serving RAT is TD-SCDMA, the (motion status) indication 512 may be forwarded to a TD-SCDMA modem. In one aspect of the disclosure, the RAT specific sensor device monitor 508 may identify information corresponding to the regular periodicity of a search and/or measurement. In one aspect of the disclosure, a multiplication factor may be applied to the search and/or measurement periodicity to prioritize a periodicity of inter-layer search and/or measurement based on the priority of the layer. The multiplication factor may be identified or determined at the RAT specific sensor device monitor 508 or the search and/or measurement module 510. The multiplication factor may be applied to the regular search and/or measurement periodicity at the search and/or measurement module 510 that schedules the search and/or measurement. Thus, the multiplication factor may be used to adjust the regular search and/or measurement periodicity.

When the UE is in the connected mode or cell dedicated channel (cell DCH for UTRAN) mode the UE may perform handover procedures including performing activities associated with neighboring RATs in the measurement gaps. For example, when the measurement gaps include idle intervals, the UE may perform measurements or searches during the idle intervals in preparation for the handover. The activities may include measurements of a layer(s) (e.g., frequencies) of the serving RAT (e.g., TD-SCDMA) and the neighboring RATs (e.g., LTE).

When the measurement gaps include the dedicated channel measurement occasions, the UE may perform the activities during the dedicated channel measurement occasions. In some instances, the activities may be performed in preparation for handover between TD-SCDMA and LTE, or between TD-SCDMA and GSM. The UE may also perform measurements (e.g., in 6 ms gaps) for handover between LTE and a different RAT or perform measurements (using WCDMA's compressed mode) for handover between WCDMA and a different RAT.

In one aspect of the disclosure, the UE may be operated according to a sensor motion detection capable configuration. In this configuration, one or more indications from the sensor module 502 may be used to prioritize a periodicity of interlayer search and measurement based on the priority of a layer. The priority of the interlayer search and/or measurement may be prioritized by adjusting the frequency that the UE performs measurements of a layer of a type of RAT, while the UE is in the connected mode.

The adjustment of the measurement periodicity in the connected mode may be based on the type of RAT (e.g. target RAT), the RAT priority, the type of call (e.g., voice and/or data call) or signal quality of the serving and/or target RAT. For example, the type of call may include a circuit switched call or a packet switched call. The target RAT may be TD-SCDMA, LTE, GSM or WCDMA. The priority of the target RAT may be higher, lower or equal to the priority of the serving RAT. In one aspect of the disclosure, the UE determines whether the serving RAT signal strength (e.g. RSCP) or signal quality (signal to noise ratio (SNR) or signal (i.e., received energy per chip)/interference level (Ec/Io)) is above/below a pre-defined threshold.

When the UE is operating in the sensor motion detection capable configuration, the target RAT may be defined as a high-priority RAT, an equal-priority RAT, or a low-priority RAT, relative to the serving RAT. In some aspects, the priority of the RAT may be based on the type of call. For example, LTE may have a higher priority for a packet switched call while GSM may have a higher priority for a circuit switched call.

In the sensor motion detection capable configuration, a value represented as a multiplication factor of regular measurement periodicity is defined as a duty cycle factor to be applied to the priority RAT type and associated call type. The duty cycle factor may be based on the motion status of the UE. For example, the duty cycle factor may be determined based on the indication corresponding to the motion of the UE. The duty cycle factor may be used to adjust (e.g., speed-up or reduce) the regular measurement periodicity. The duty cycle factor may be deemed a connection mode sensor factor with priority and call domain differentiation and may be represented as follows:
connmode_sensor_factor_high/equal/low_PS/CSdomain Illustratively, when the UE is in the connected mode on a TD-SCDMA cell, LTE may be defined as a high priority RAT for a packet switched call while GSM may be defined as a low priority RAT for the packet switched call. Measurement in this connected mode may be based on dedicated channel measurement occasions where the call domain type is set to packet switched call and measurement is activated (e.g., to "measure all"). For example, the modem 504 receives the indication that shows the mobility state of the UE from the sensor module 502.

In some aspects, the duty cycle factor may be configured to support only high priority and/or equal priority RAT(s) while low priority RAT(s) are unsupported to conserve UE power. In this case, the duty-cycle factor for high-priority and/or equal priority RAT measurements are turned on while the duty-cycle factor for low-priority RAT measurements are turned off. In other aspects, the duty-cycle factor for high-priority RAT measurements may be turned on while the duty-cycle factor for equal priority and/or low-priority RAT measurements are turned off. In conjunction with or in response to turning off the duty cycle factor of a RAT, the UE may stop measurement of the RAT (e.g., low priority RAT) and turn off some features of the UE to conserve power.

Tables 1, 2 and 3 illustrate exemplary configurations for different priority target RATs operating in the sensor motion detection capable configuration for different call-domain types. Tables 1, 2 and 3 correspond to a configuration for a packet switched call, a circuit switched call and a circuit switched call plus packet switched call, respectively, where the high-priority RAT is a LTE, the equal priority RAT is TD-SCDMA and the low priority RAT is GSM. The first column of the tables represents a connection mode sensor factor (or duty cycle factor) with priority and call domain differentiation while the second column represents a corresponding RAT type configured priority.

In the tables, the duty cycle factor for each priority RAT and call type is matched to the corresponding priority RAT. The duty cycle factor for each priority RAT can be turned on to adjust the periodicity of measurement of the target RAT based on the priority of the target RAT.

In some implementations, the priority of the RAT may be configured based on the call type (e.g., voice or data call) to facilitate different power savings and RAT priority strategies for different types of calls. In addition, the UE may adjust the measurements (e.g., measurement periodicities) associated with the network configured measurement gaps based on the serving cell/RAT signal strengths (e.g., RSCP) or signal quality (SNR or Ec/Io) when the UE is in a stationary or mobile state. For example, the periodicity of the measurement may be adjusted based on whether the signal strength and/or quality is above or below a threshold.

Further, the duty cycle factor of a particular target RAT may be turned off to conserve power. Furthermore, the duty cycle factor may be adjustable to gradually increase or decrease the measurement periodicity. For example, the duty cycle factor may be set to a value based on the desirable periodicity of the measurements.

For example, to configure the UE to only support a duty cycle factor for high priority and equal priority RAT measurements and turn off connected mode measurements for low priority RATs for a packet switched call, the ConnMode_sensor_factor_high, ConnMode_sensor_factor_equal and the ConnMode_sensor_factor_low may be respectively set to values of 0.2, 0.1 and 0.0. This means that the LTE RAT measurements may be performed at a duty cycle factor of 0.2, the TD-SCDMA measurements performed at a duty cycle factor of 0.1 while the GSM measurements are not performed.

TABLE 1

| ConnMode sensor factor with priority and call-domain differentiation | RAT type configured priority associated with ConnMode sensor factor |
|---|---|
| ConnMode_sensor_factor_high_PSdomain | LTE |
| ConnMode_sensor_factor_equal_PSdomain | TD-SCDMA intra and inter |
| ConnMode_sensor_factor_low_PSdomain | GSM |

TABLE 2

| ConnMode sensor factor with priority and call-domain differentiation | RAT type configured priority associated with ConnMode sensor factor |
|---|---|
| ConnMode_sensor_factor_high_CSdomain | GSM |
| ConnMode_sensor_factor_equal_CSdomain | TD-SCDMA intra and inter |
| ConnMode_sensor_factor_low_CSdomain | LTE |

TABLE 3

| ConnMode sensor factor with priority and call-domain differentiation | RAT type configured priority associated with ConnMode sensor factor |
|---|---|
| ConnMode_sensor_factor_high_CS_PS_domain | GSM |
| ConnMode_sensor_factor_equal_CS_PS_domain | TD-SCDMA intra and inter |
| ConnMode_sensor_factor_low_CS_PS_domain | LTE |

When the UE is in the discontinuous reception mode, for example, reselection from a first RAT (e.g., TD-SCDMA/GSM) to a second RAT (e.g., LTE) or vice versa may be based on the priority of the RATs.

In one aspects of the disclosure, the indications from the sensor module 502 may be used to adjust how frequent the UE performs discontinuous reception mode searches and measurements for priority based inter radio access technology (IRAT) reselection. The search and measurements may include measurements of the layer(s) of the RAT(s). For example, the search and/or measurement periodicity may be adjusted for the frequencies/cells of the different priority RATs. In some implementations, the adjustment may be different for each priority RAT in accordance with a flexible design framework. For example, the UE may be configured to completely turn off search for low priority layers. The UE may also be configured to activate or maintain a lower duty-cycle factor for high-priority and/or equal priority layers. In some aspects of the disclosure, the indications from the motion sensor may also be used to adjust how frequently the UE performs discontinuous reception mode searches and measurements for rank based IRAT reselection. For example, the RATs may be ranked based on signal quality.

Illustratively, when the UE is in the discontinuous reception mode (e.g., idle-mode or Cell-URA/Cell-PCH/Cell-FACH mode) the UE may receive the indications from the sensor module 502. The indications may represent the motion status of the UE. For example, the indications may show that the UE transitioned from mobile to stationary or transitioned from high-mobility to low-mobility. A search/measurement periodicity or timer may be adjusted based on the indications and/or priority/ranking of layers of the RAT(s). Adjusting the search/measurement periodicity or timer to prioritize periodicity of interlayer search and/or measurement provides the flexibility to tune the UE power savings based on a priority of the layers and the motion status of the UE.

In one aspect of the disclosure, when the UE transitions to a stationary state during a high priority, equal priority or low priority search/measurement, the UE applies a value (e.g., duty cycle factor) based on the stationary state of the UE and corresponding search type (e.g., high/equal/low priority) to the search/measurement timer or search/measurement periodicity. For example, when the UE is in the discontinuous reception mode, the UE receives an indication from the sensor module 502 that represents the mobility status of the UE. The value may be defined based on the indication and the corresponding mobility status of the UE as well as a priority of the layers of the RAT. To perform a search/measurement in the discontinuous reception mode, the value, which may be deemed a sensor_factor_stationary_high/equal/low_priority_srch/meas, may be applied to the search/measurement timer to prioritize the periodicity of interlayer search/measurement.

When the UE transitions to a low/high mobility state during a high priority, equal priority or low priority search/measurement, the modem 504 receives the indication 512 corresponding to the low/high mobility state of the UE from the sensor module 502. The value corresponding to the transition from the low/high mobility state may be deemed a sensor_factor_low/high mobility_high/equal/low_priority_srch/meas value. The value may be applied to the search/measurement timer to prioritize the periodicity of interlayer search/measurement and to conserve power.

Illustratively, when the UE is in the stationary state, the measurement timer may be set to a fifty percent duty cycle of an original measurement timer. For example, if the original periodicity is 5.12 seconds, a fifty percent duty cycle adjustment of the measurement periodicity is 2*5.12 seconds (i.e., 10.24 seconds). Similarly, the search timer may also be set to fifty percent of an original search timer for all the layers. In some implementations, when the UE is in the stationary state, the search timer may be set to one hundred percent of a high priority search timer. In this implementation, the measurement timer may be set to fifty percent of an original measurement timer. As a result, the measurement periodicity is less frequent and the power conservation associated with measurements is larger. For example, the measurement frequency for TD-SCDMA to LTE reselection or handover may be 5.12 seconds for a 640 discontinuous reception cycle.

Figure 6:
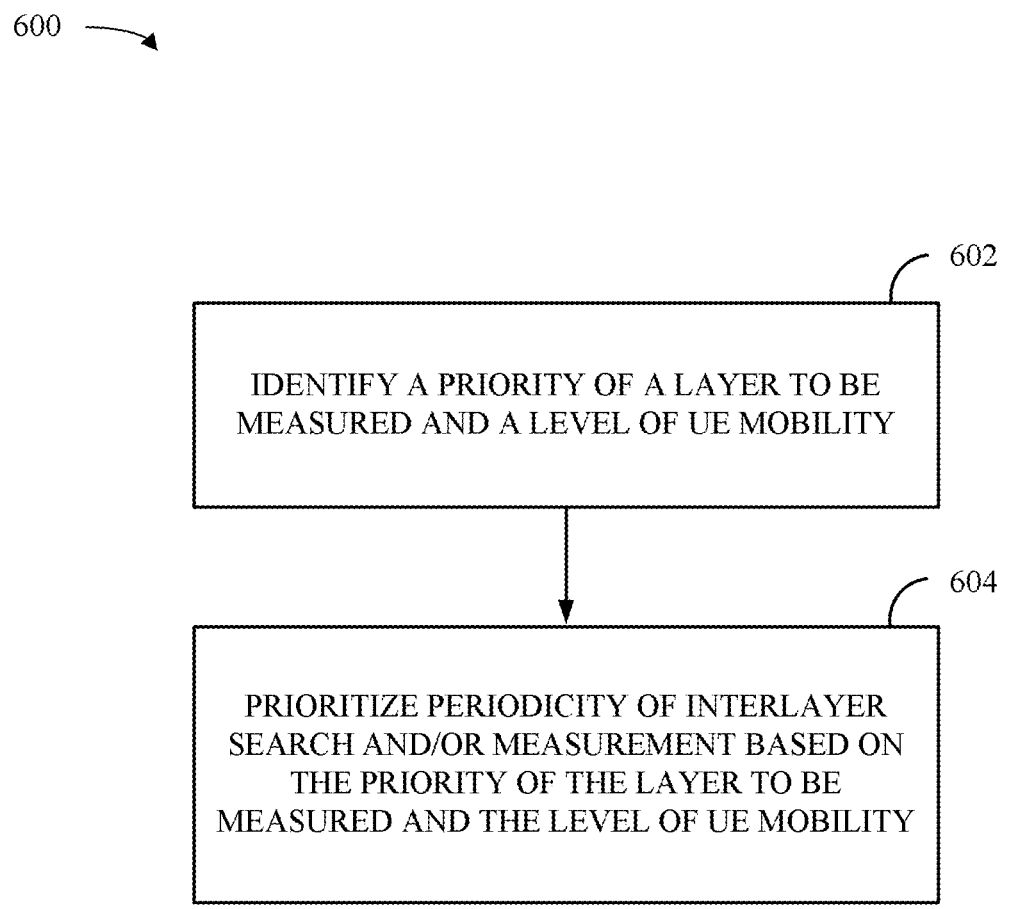
FIG. 6 shows a wireless communication method according to one aspect of the present disclosure.

FIG. 6 shows a wireless communication method 600 according to one aspect of the disclosure. A UE identifies a priority of a layer of a RAT to be measured or searched and identifies a level of mobility of the UE, as shown in block 602. For example, a sensor module of the UE may determine the level of mobility of the UE and generate an indication corresponding to the level of mobility of the UE. The UE prioritizes a periodicity of interlayer search and/or measurement based on the priority of the layer to be measured and the level of the mobility of the UE, as shown in block 604.

Figure 7:
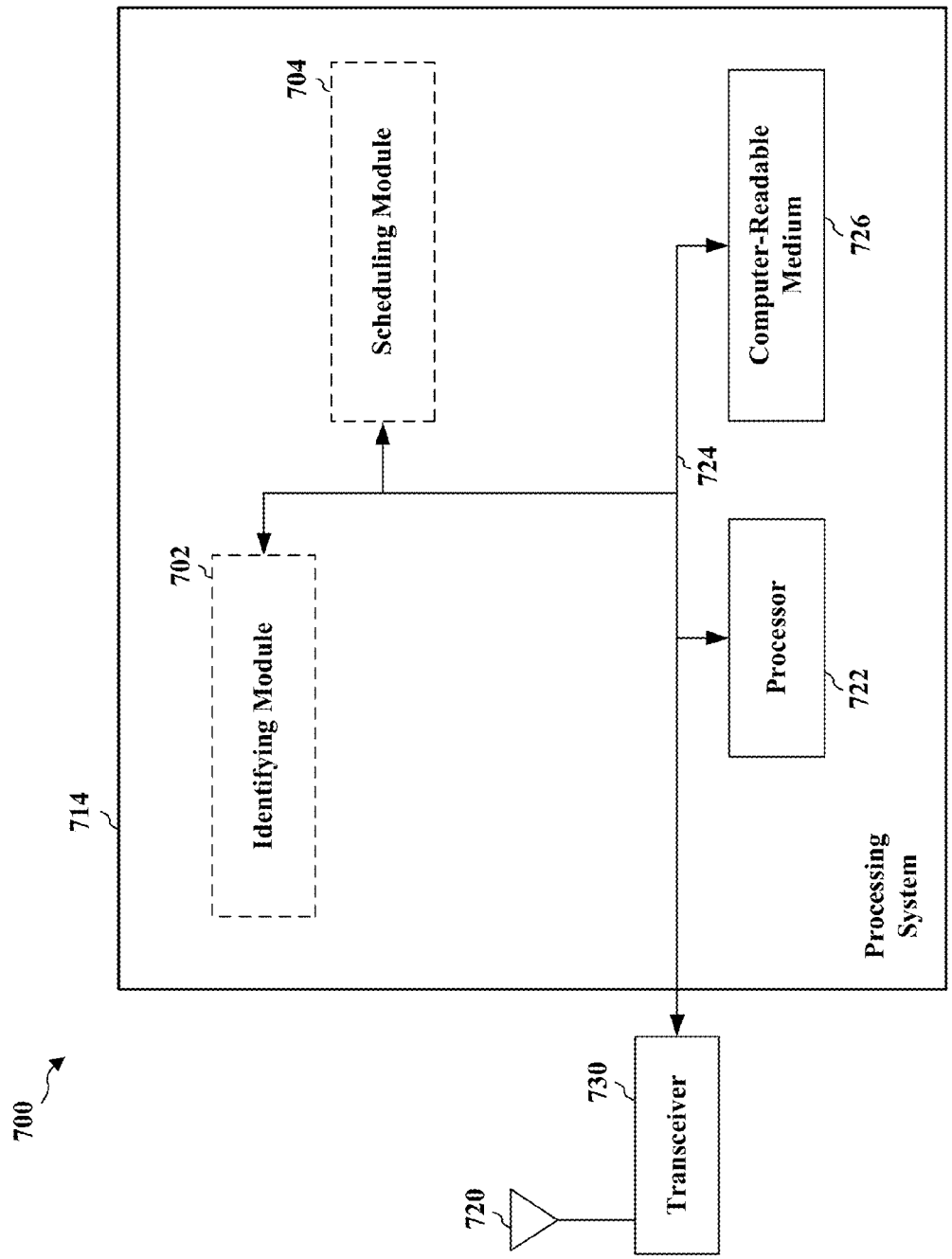
FIG. 7 is a diagram illustrating an example of a hardware implementation for an apparatus employing a processing system according to aspects of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704 and the non-transitory computer-readable medium 726. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a non-transitory computer-readable medium 726. The processor 722 is responsible for general processing, including the execution of software stored on the computer-readable medium 726. The software, when executed by the processor 722, causes the processing system 714 to perform the various functions described for any particular apparatus. The computer-readable medium 726 may also be used for storing data that is manipulated by the processor 722 when executing software.

The processing system 714 includes an identifying module 702 for identifying a priority of a layer of a RAT to be measured or searched and for identifying a level of mobility of the UE. The processing system 714 also includes a scheduling module 704 for prioritizing a periodicity of interlayer search and/or measurement based on the priority of the layer to be measured and the level of the mobility of the UE. The modules may be software modules running in the processor 722, resident/stored in the computer-readable medium 726, one or more hardware modules coupled to the processor 722, or some combination thereof. The processing system 714 may be a component of the UE 350 and may include the memory 392, and/or the controller/processor 390.

In one configuration, an apparatus such as a UE is configured for wireless communication including means for identifying. In one aspect, the identifying means may be the antennas 352/720, the receiver 354, the transceiver 730, the channel processor 394, the receive frame processor 360, the receive processor 370, the controller/processor 390, the memory 392, the mobility based power conservation module 391, the identifying module 702, the sensor module 502, the common sensor device 506, the RAT specific sensor device monitor 508, the search and/or measurement module 510, the modem 504 and/or the processing system 714 configured to perform the aforementioned means. The UE is also configured to include means for scheduling. In one aspect, the scheduling means may be the antennas 352/720, the receiver 354, the transceiver 730, the channel processor 394, the receive frame processor 360, the receive processor 370, the controller/processor 390, the memory 392, mobility based power conservation module 391, the scheduling module 704, the search and/or measurement module 510, the modem 504 and/or the processing system 714 configured to perform the aforementioned means. In one configuration, the means functions correspond to the aforementioned structures. In another aspect, the aforementioned means may be any module or any apparatus configured to perform the functions recited by the aforementioned means.

Several aspects of a telecommunications system have been presented with reference to LTE, TD-SCDMA and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, high speed downlink packet access (HSDPA), high speed uplink packet access (HSUPA), high speed packet access plus (HSPA+) and TD-CDMA. Various aspects may also be extended to systems employing long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    setting a priority of a layer relative to other layers based at least in part on a current call type and radio access technology (RAT) type while a user equipment (UE) is in an idle mode or in a connected mode; and
    prioritizing a periodicity of interlayer search and/or measurement based at least in part on the priority of the layer to be measured and a level of UE mobility.

2. The method of claim 1, further comprising determining the periodicity of the interlayer search and/or the periodicity of the interlayer measurement independently.

3. The method of claim 2, in which the independently determining comprises adjusting the periodicity of the interlayer search by a first multiplication factor based at least in part on the level of the UE mobility and adjusting the periodicity of the interlayer measurement by a second multiplication factor based at least in part on the level of the UE mobility.

4. The method of claim 1, in which the prioritizing comprises applying a multiplication factor to the periodicity.

5. The method of claim 1, further comprising stopping measurement of a low priority layer when the UE is in the idle mode.

6. The method of claim 1, further comprising stopping measurement of a low priority layer.

7. The method of claim 1, further comprising powering off radio frequency (RF) circuitry during network measurement gaps for a low priority layer.

8. The method of claim 1, in which the prioritizing is further based at least in part on a serving cell signal strength and/or quality.

9. The method of claim 1, in which the level of the UE mobility is determined by a motion sensor.

10. An apparatus for wireless communication, comprising:
    means for setting a priority of a layer relative to other layers based at least in part on a current call type and radio access technology (RAT) type while a user equipment (UE) is in an idle mode or in a connected mode;
    means for identifying the priority of the layer to be measured and a level of UE mobility; and
    means for prioritizing a periodicity of interlayer search and/or measurement based at least in part on the priority of the layer to be measured and the level of the UE mobility.

11. The apparatus of claim 10, further comprising means for determining the periodicity of the interlayer search and/or the periodicity of the interlayer measurement independently.

12. The apparatus of claim 11, in which the determining means comprises means for adjusting the periodicity of the interlayer search by a first multiplication factor based at least in part on the level of the UE mobility and means for adjusting the periodicity of the interlayer measurement by a second multiplication factor based at least in part on the level of the UE mobility.

13. An apparatus for wireless communication, comprising:
    a memory; and
    at least one processor coupled to the memory and configured:
        to set a priority of a layer relative to other layers based at least in part on a current call type and radio access technology (RAT) type while the UE is in an idle mode or a connected mode; and to prioritize a periodicity of interlayer search and/or measurement based at least in part on the priority of the layer to be measured and a level of UE mobility.

14. The apparatus of claim 13, in which the at least one processor is further configured to determine the periodicity of the interlayer search and/or the periodicity of the interlayer measurement independently.

15. The apparatus of claim 14, in which the at least one processor is further configured to independently determine by adjusting the periodicity of the interlayer search by a first multiplication factor based at least in part on the level of the UE mobility and by adjusting the periodicity of the interlayer measurement by a second multiplication factor based at least in part on the level of UE mobility.

16. The apparatus of claim 13, in which the at least one processor is further configured to prioritize by applying a multiplication factor to the periodicity.

17. The apparatus of claim 13, in which the at least one processor is further configured to stop measurement of a low priority layer when the UE is in the idle mode.

18. The apparatus of claim 13, in which the at least one processor is further configured to stop measurement of a low priority layer.

19. The apparatus of claim 13, in which the at least one processor is further configured to power off radio frequency (RF) circuitry during network measurement gaps for a low priority layer.

20. The apparatus of claim 13, in which the at least one processor is further configured to prioritize based at least in part on a serving cell signal strength and/or quality.

21. The apparatus of claim 13, in which the level of the UE mobility is determined by a motion sensor.

22. A computer program product for wireless communication, comprising:
a non-transitory computer-readable medium having program code recorded thereon, the program code comprising:
program code to set a priority of a layer to other layers based at least in part on a current call type and radio access technology (RAT) type while the UE is in an idle mode or a connected mode; and
program code to prioritize a periodicity of interlayer search and/or measurement based at least in part on the priority of a layer to be measured and a level of UE mobility.

23. The computer program product of claim 22, further comprising program code to determine the periodicity of the interlayer search and/or the periodicity of the interlayer measurement independently.

24. The computer program product of claim 23, in which the program code to determine further comprises program code to adjust the periodicity of the interlayer search by a first multiplication factor based at least in part on the level of the UE mobility and program code to adjust the periodicity of the interlayer measurement by a second multiplication factor based at least in part on the level of UE mobility.

* * * * *